(12) United States Patent
Crutchfield et al.

(10) Patent No.: US 11,858,862 B1
(45) Date of Patent: Jan. 2, 2024

(54) METHOD OF PRODUCING MACHINED CMC SURFACES WITHOUT EXPOSING FIBER

(71) Applicant: Rolls-Royce High Temperature Composites Inc., Cypress, CA (US)

(72) Inventors: Jeffrey Crutchfield, Cypress, CA (US); Pathikumar Sellappan, Cypress, CA (US); Chris Downie, Cypress, CA (US); Christopher Mara, Cypress, CA (US); Sungbo Shim, Cypress, CA (US)

(73) Assignee: ROLLS-ROYCE HIGH TEMPERATURE COMPOSITES INC., Huntington Beach, CA (US)

( * ) Notice: Subject to any disclaimer, the term of this patent is extended or adjusted under 35 U.S.C. 154(b) by 0 days.

(21) Appl. No.: 17/871,401

(22) Filed: Jul. 22, 2022

(51) Int. Cl.
C04B 35/80 (2006.01)
C04B 35/657 (2006.01)
C04B 35/628 (2006.01)

(52) U.S. Cl.
CPC ........ *C04B 35/80* (2013.01); *C04B 35/62884* (2013.01); *C04B 35/62892* (2013.01); *C04B 35/62894* (2013.01); *C04B 35/62897* (2013.01); *C04B 35/657* (2013.01); *C04B 2235/5252* (2013.01); *C04B 2235/612* (2013.01); *C04B 2235/616* (2013.01)

(58) Field of Classification Search
CPC ............................ C04B 35/80; C04B 35/628
See application file for complete search history.

(56) References Cited

U.S. PATENT DOCUMENTS

| | | | |
|---|---|---|---|
| 9,797,263 B2 | 10/2017 | Varney et al. | |
| 10,024,175 B2 | 7/2018 | Varney | |
| 11,186,525 B2 | 11/2021 | Shim et al. | |
| 2005/0247425 A1* | 11/2005 | Devine | B22C 9/10 |
| | | | 164/369 |
| 2018/0238181 A1* | 8/2018 | Reynolds | F02C 3/14 |
| 2019/0256427 A1* | 8/2019 | Shim | B32B 18/00 |
| 2021/0070664 A1 | 3/2021 | Sellappan et al. | |
| 2022/0169574 A1 | 6/2022 | Shim et al. | |

FOREIGN PATENT DOCUMENTS

EP 3 971 153 A 3/2022

* cited by examiner

*Primary Examiner* — Robert A Vetere
(74) *Attorney, Agent, or Firm* — Crowell & Moring LLP

(57) ABSTRACT

A method to produce a ceramic matrix composite part, wherein the method comprises providing a ceramic fiber preform. Wherein the ceramic fiber preform includes a three-dimensional framework of a plurality of ceramic fibers. The method comprising, prior to melt infiltration, adding a layer of machinable stock to a target area of the ceramic fiber preform, melt infiltrating the ceramic fiber preform, forming the ceramic matrix composite part by cooling the melt infiltrated ceramic fiber preform, and machining the part in the target area where the machinable stock is located.

20 Claims, 4 Drawing Sheets

METHOD OF PRODUCING MACHINED CMC SURFACES WITHOUT EXPOSING FIBER

TECHNICAL FIELD

This disclosure relates to ceramic matrix composite materials and, in particular, to methods of manufacturing and machining ceramic matrix composite materials.

BACKGROUND

Present methods of manufacturing and machining ceramic composite matrix parts suffer from a variety of drawbacks, limitations, and disadvantages. Accordingly, there is a need for inventive systems and methods described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Methods of producing a ceramic matrix composite part are provided. A ceramic fiber preform may be provided, the ceramic fiber preform including a three-dimensional framework of a plurality of ceramic fibers. Prior to melt infiltration, a layer of machinable stock may be added to a target area of the ceramic fiber preform. Melt infiltration may be performed on the ceramic fiber preform. The ceramic matrix composite part may be formed by cooling the melt infiltrated ceramic fiber preform. The part may be machined in the target area where the machinable stock is located.

One interesting feature of the systems and methods described below may be that the machinable stock may protect the fiber and fiber coatings of the ceramic matrix preform from exposure to environmental risks, therefore increasing the life of the ceramic composite part. Alternatively, or in addition, an interesting feature of the systems and methods described below may be that use of the machinable stock may prevent the need for an environmental barrier coating (EBC) to protect the ceramic matrix composite part, which may be costly and time-consuming to apply. Alternatively, or in addition, an interesting feature of the systems and methods described below may be that use of the machinable stock may eliminate the need for a second machining process. Alternatively or in addition, the machinable stock may allow for improved dimensional tolerance of the part, better surface finishing, reduced porosity on seal surfaces, and/or a thinner coating on flow paths of the part without intentionally or inadvertently machining into the fibers of the preform.

Figure 1:
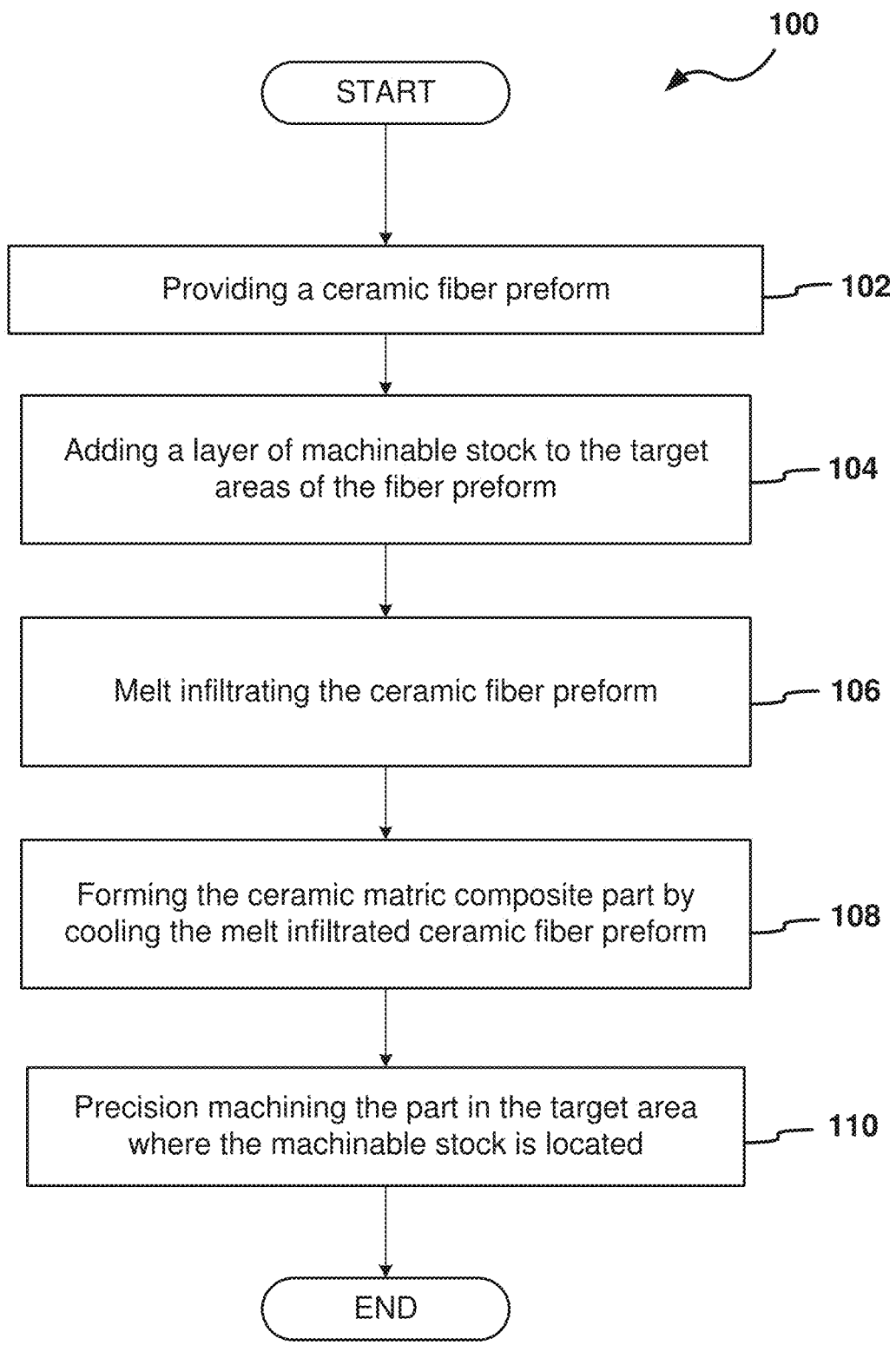
FIG. 1 illustrates a flow diagram of an example method of forming a ceramic matrix composite part with a machinable stock.

FIG. 1 illustrates a flow diagram of a method 100 to produce a ceramic matrix composite. As further explained below, ceramic fibers, which are in a ceramic fiber preform may be arranged in fiber tows or, additionally or alternatively, may not be arranged in tows and may be arranged as individual fibers.

The ceramic fiber preform (or simply "preform") may comprise a three-dimensional framework of, for example, continuous ceramic fibers. The ceramic fiber preform may have the approximate shape of a ceramic matrix composite component being produced. Examples of the ceramic fibers may include carbon (C), silicon carbide (SIC), alumina ($Al_2O_3$) and mullite ($Al_2O_3$-$SiO_2$) fibers. In the context of this disclosure, carbon and carbon fibers may be considered ceramic material even if carbon and carbon fibers are not generally considered ceramic material.

Referring again to FIG. 1, the method 100 may begin by providing (102) the fiber preform 202 (shown in FIGS. 2-5). In some examples, the preform may be formed by laying up plies comprising fibers or tows of fibers 204 (shown in FIGS. 2-5) arranged in a two- or three-dimensional weave. The two- or three-dimensional weave for each of the plies may be formed by weaving the fibers or tows together. Alternatively, the entire preform may be formed by weaving a three-dimensional weave. In still other examples, the preform may be formed by laying up tape that includes the fibers and/or tows of fibers. Any other method of forming the fiber preform may be used as long as the fiber preform includes one or more fibers or fiber tows.

The method may further comprise, before or after forming the framework, forming an interface coating on the ceramic fibers to provide a weak fiber-matrix interface once the CMC is formed, which can be beneficial for fracture toughness. Typically, the interface coating includes one or more layers comprising boron nitride and/or silicon-doped boron nitride, The matrix material is typically deposited after the interface coating.

The method may also include forming a rigidized fiber preform by depositing a matrix material such as silicon carbide on the fiber preform via chemical vapor infiltration or another deposition process known in the art. The fiber preform, which may be a rigidized fiber preform as described above, may be infiltrated with a slurry comprising ceramic particles and optionally reactive elements/particles to form an impregnated fiber preform, i.e., a fiber preform loaded with particulate matter (ceramic and optionally other particles), prior to application of the slurry layer, as discussed above. Typically, the impregnated fiber preform comprises a loading level of particulate matter from about 40 vol.% to about 60 vol.%, with the remainder being porosity. In addition, the method may further comprise, after applying the heat and pressure to form the protective surface layer 116, melt infiltrating the fiber preform 102 followed by cooling, thereby forming a ceramic matrix composite 122 that has the protective surface layer 116. hi embodiments where the particulate layer 104 is formed on a fiber preform 102 comprising a melt-infiltrated preform, as discussed above, the ceramic matrix composite 122 is already present during the formation of the protective surface layer 116.

Still referring to FIG. 1, the method may continue by infiltrating the fiber preform with a matrix material. Infiltrating the fiber preform with the matrix material may, for example, comprise slurry infiltration. During slurry infiltration, the rigidized fiber preform may be infiltrated with a slurry comprising ceramic particles and optionally reactive elements/particles to form an impregnated fiber preform or "green body," in other words, a fiber preform loaded with particulate matter. Typically, the impregnated fiber preform comprises a loading level of particulate matter from about 40 vol.% to about 60 vol.%, with the remainder being porous.

After slurry infiltration, a machinable stock 206, 402 (shown in FIGS. 2-5) may be added (104) to target areas of the ceramic preform 202 (shown in FIGS. 2-5). Additionally or alternatively, the machinable stock 206, 402 may be applied to the preform 202 during, or simultaneously with, the slurry infiltration. Adding the machinable stock may comprise the application of layers of ceramic slurry 206 (shown in FIGS. 2-5) and/or ceramic tape 402 (shown in FIGS. 2-5) and/or combination of both.

For example, one or more layers of ceramic slurry 206 may be added to the surface of the of the fiber preform 202. The slurry 206 may comprise ceramic particles in a carrier liquid. The slurry 206 may be, for example, sprayed on to the surface of the preform 202. The slurry 206 may be applied at room temperate, may have relatively low viscosity and, for example, may be water based. The slurry 206 may be dried after application to remove the water. The slurry 206 may, for example, be sanded after application to even out or flatten the surface of the preform 202 after application of the slurry 206. The application of the multiple slurry layers may comprise spraying, dip-coating, spin-coating and/or another deposition method. Typically, application of the slurry layers 122 is carried out under ambient conditions, such as at atmospheric pressure, in air, and/or at room temperature (20-25° C.). Active drying to remove the carrier liquid may be carried out at room temperature or at an elevated temperature (e.g., from about 30° C. to about 200° C.) in ambient conditions or in a controlled environment, such as under vacuum or in an inert gas atmosphere; passive drying may occur by evaporation during or after application of the slurry layers. A typical time duration for drying is from about two hours to about 24 hours.

Additionally or alternatively, the machinable stock 206, 402 may be added (104) to target areas of the ceramic preform 202 by applying one or more layers of ceramic tape 402 to the surface of the fiber preform 202. Such an application of ceramic tape and/or slurry, for example, may be described in U.S. Pat. No. 11,186,525 and U.S. Patent Application Publication 2022/0169574, both of which are incorporated by reference. The ceramic tape 402 may comprise ceramic particles in a polymeric binder. The ceramic tape 402 may be prepared by tape casting a typically water-based slurry comprising the ceramic particles and the polymeric binder onto a flexible polymeric sheet, followed by drying of the slurry and separation of the ceramic tape from the polymeric sheet. The ceramic tape 402 may have a thickness in a range from about 50 μm to about 250 μm (about 2-10 mils). Additionally or alternative, up to 1.2 mm of ceramic tape may be applied 402, for example, by layering 6×0.2 mm pieces of ceramic tape 402, or, additionally or alternatively, by using a single piece of tape 402 1.2-2 mm of maximum thickness. The ceramic particles may comprise silicon carbide particles, silicon nitride particles, and/or silicon nitrocarbide particles. The polymeric binder may comprise polyethylene glycol, an acrylate co-polymer, a latex co-polymer, and/or polyvinyl butyral. In addition to the ceramic particles and polymeric binder, the ceramic tape may further include a dispersant, such as ammonium polyacrylate, polyvinyl butyral, a phosphate ester, polyethylene imine, and/or BYK® 110 (Byk USA, Wallingford, CT), and/or a plasticizer. Like the inner and outer slurry layers discussed above, the ceramic tape may further comprise other particulate solids in addition to the ceramic particles, such as silicon particles, carbon particles and/or other types of reactive particles. The ceramic and other optional particulate solids employed for the inner and outer tape layers typically have an average width or diameter in a range from about 0.5 micron to about 20 microns.

Prior to applying the tape 402, an adhesive may be deposited (e.g., by spraying) to promote attachment of the ceramic tape. The adhesive may comprise the polymeric binder used in the ceramic tape 402. Typically, application of the tape 402 layers is carried out under ambient conditions, such as at atmospheric pressure, in air, and/or at room temperature (20-25° C.). After application the layers of ceramic slurry and/or layer of ceramic tape may be laminated together and/or to the surface to form the porous ceramic multilayer. Lamination may comprise, for example, vacuum bagging. Lamination may comprise applying pressure and heat to the tape, for example, pressure of approximately −20 to −30 inHg at 90-120° C. for 30 minutes to 2 hours. During lamination, tooling may be applied to the preform 202, slurry 206, and/or tape 402 assembly, for example, to apply pressures and/or impart a shape onto the surface of the preform 202. After lamination, the preform 202 may be cooled to room temperature and the tooling removed.

Still referring to FIG. 1, the method may continue by infiltrating (106) the fiber preform 202 with a matrix material aging. Infiltrating (106) the fiber preform with the matrix material may, for example, include melt infiltration.

During melt infiltration, a molten material may be infiltrated into the fiber preform 202 (which may be a rigidized and/or impregnated fiber preform as described above). The molten material may, for example, consist essentially of silicon (e.g., elemental silicon and any incidental impurities) or may comprise a silicon-rich alloy. Alternatively, the molten material may comprise any other molten matrix material. Melt infiltration may be carried out at a temperature at or above the melting temperature of silicon or the silicon alloy which is infiltrated. Thus, the temperature for melt infiltration is typically in a range from about 1400° C. to about 1500° C. A suitable time duration for melt infiltration may be from 15 minutes to four hours, depending in part on the size and complexity of the ceramic matrix composite to be formed. However, other durations may be possible. A ceramic matrix is formed from ceramic particles as well as ceramic reaction products created from the reaction between the molten material and any other reactive particles (e.g., carbon particles, refractory metal particles) in the fiber preform. Typically, the ceramic matrix comprises silicon carbide, but may also or alternatively comprise silicon oxycarbide, silicon nitride, alumina, aluminosilicate, and/or boron carbide or another refractory carbide. Cooling (108) may follow melt infiltration, thereby forming a densified ceramic matrix composite.

The surface of the preform 202, with the added machinable stock 206, 402, may then be machined (110) as desired to meet any dimensional tolerances in any target areas of the ceramic matrix composite part 600 (shown in FIGS. 6A-B and 7-8). The machinable stock added may have a thickness of 200-2000 μm, particularly a thickness of 300-1200 μm. For example, the ceramic matrix composite part 600 may be a part of a turbine engine, such as a blade, vane, or seal segment. Specific areas of the ceramic matrix composite part 600 may require precision machining to meet necessary dimensional tolerances and/or surface quality standards. A precision machined surface feature is defined as any surface feature with a profile tolerance of 0.25 mm, For example, such target areas may be seal lands, flow paths, and/or datum surfaces. In some examples, the machinable stock 206, 402 may be added only to critical areas of the part 600. For example, target areas of the part 600 may require a profile tolerance of 0.10 mm on sealing surfaces, 0.20 mm on coating substrate surfaces, and/or flatness of 0.050 mm for datum surfaces.

Figure 2:
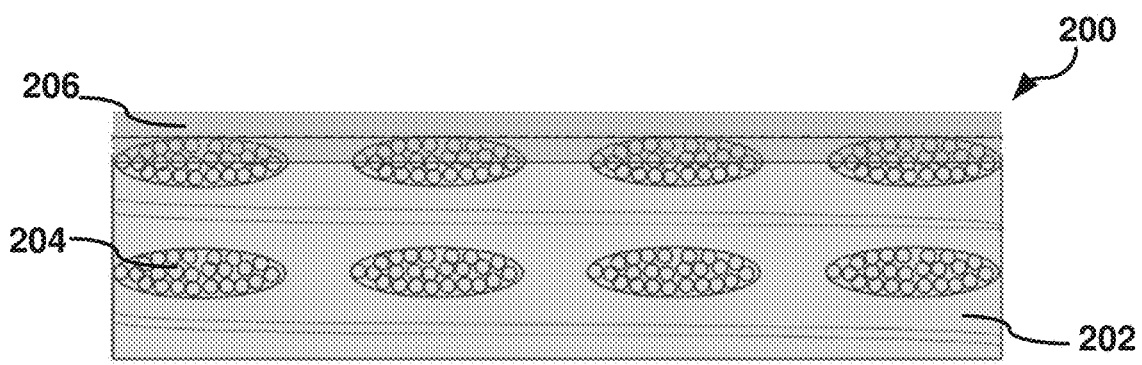
FIGS. 2-5 illustrates a cross-sectional view of an example of a ceramic matrix composite part being formed using a method of forming a ceramic matric composite with a machinable stock.

FIGS. 2-5 illustrate a cross-sectional view of an example of a ceramic matrix composite part being formed using a method of forming a ceramic matric composite with a machinable stock, for example, the method shown in FIG. 1. FIGS. 2-5 illustrate an example target area 200 of a ceramic matrix composite part. FIG. 2 illustrates the fiber preform 202 comprising fibers or tows of fibers 204 after slurry infiltration, In FIG. 2, a first layer 206 of the machinable stock is shown applied to the surface of the preform 202. The first layer 206 may, for example, be a layer of ceramic slurry sprayed onto the preform 202. Additionally or alternatively, the first layer 206 may be ceramic tape.

Figure 3:
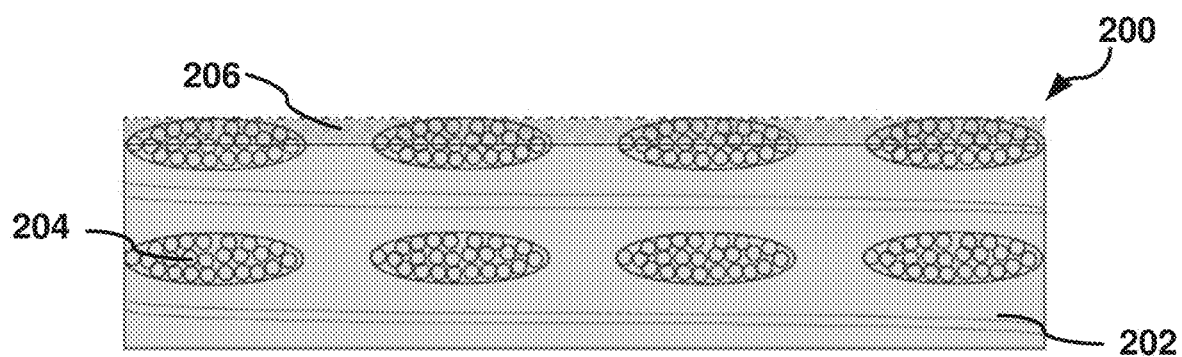
Figure 4:
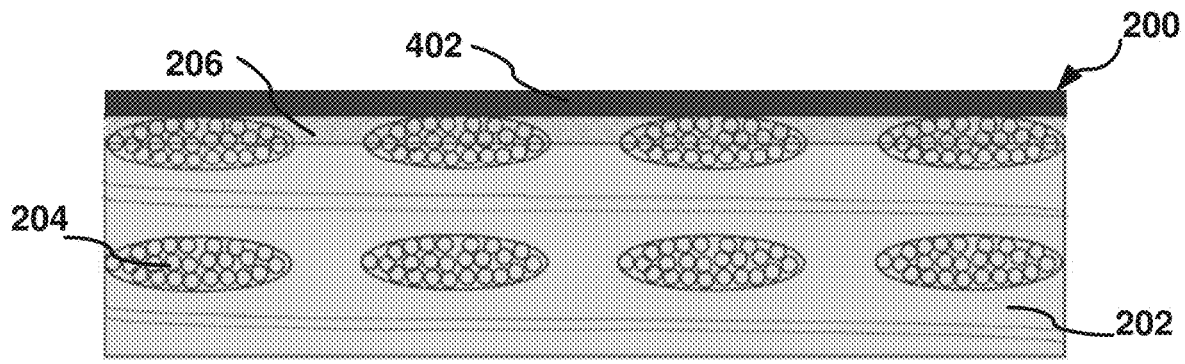
Figure 5:
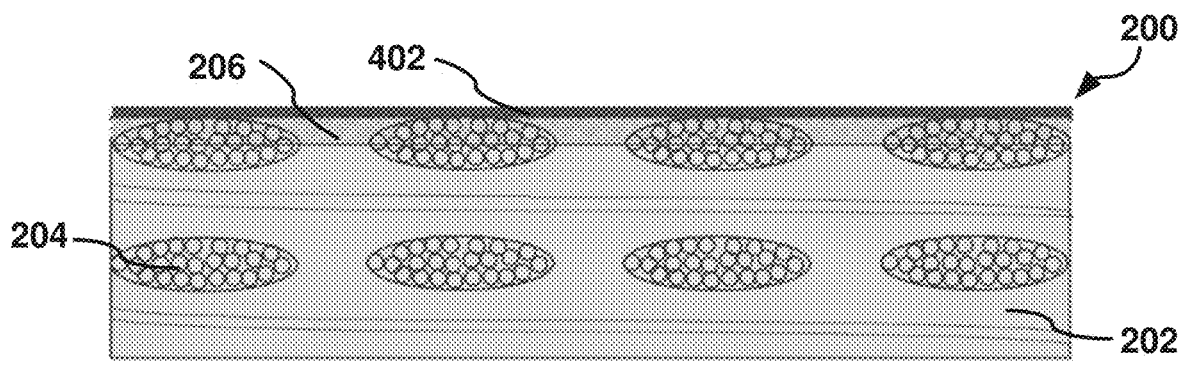

FIG. 3 illustrates the sanding of the first layer 206 of the machinable stock to even or level the surface of the preform 202. For example, a sanded down layer of ceramic slurry. FIG. 4 illustrates the application of a second layer 402 of machinable stock. The second layer 402 may comprise, for example, a layer of ceramic slurry applied (such as sprayed) onto the preform 202. Additionally or alternatively, the second layer 402, may comprise ceramic tape applied on top of the first layer 206 of the machinable stock. Each layer 206, 402 may comprise multiple additional layers, such that the machinable stock is built up to be a thick as needed to accommodate the needed machined surface features and/or tolerances. FIG. 5 illustrates a machined machinable stock layer 206, 402, machined to a specified dimensional tolerance of the target area 200.

Figure 6A:
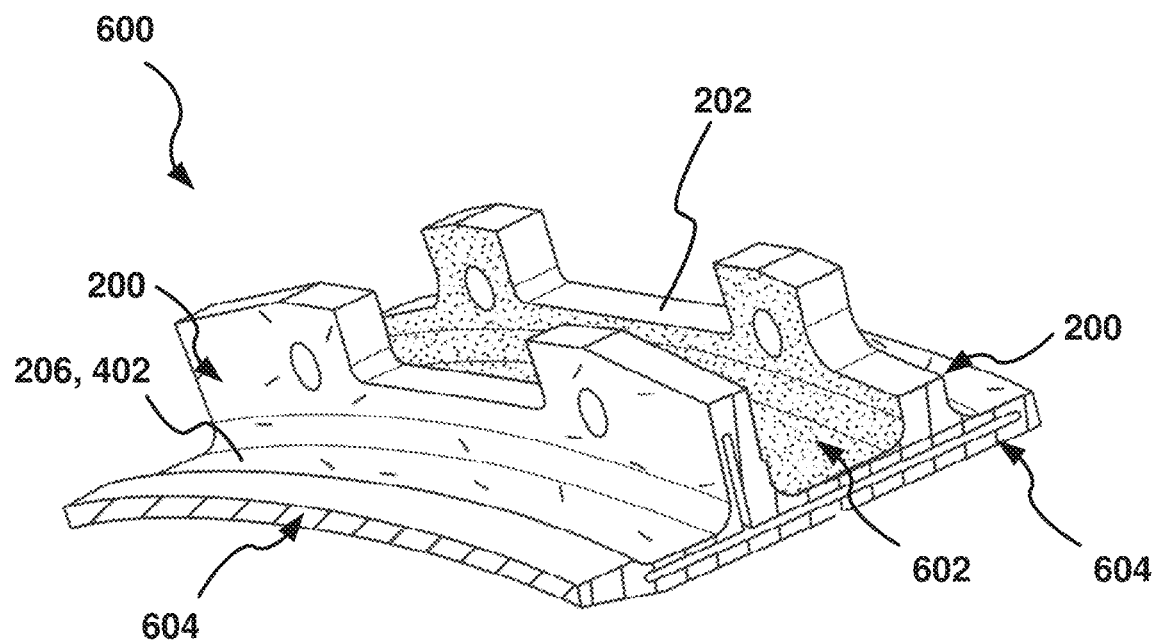
FIGS. 6A-B illustrate a top perspective view and a bottom perspective view, respectively, of an example of a machined ceramic matrix composite part.
Figure 6B:
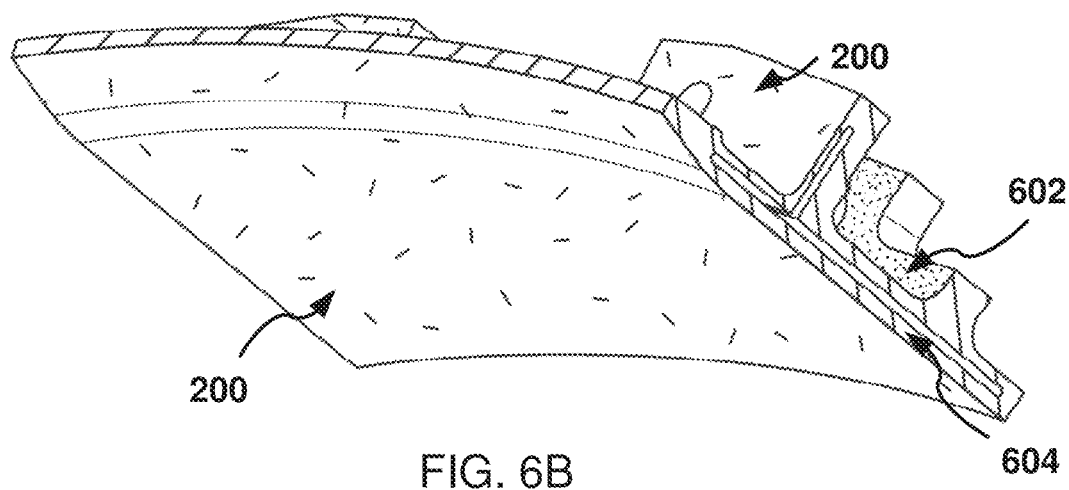
Figure 8:
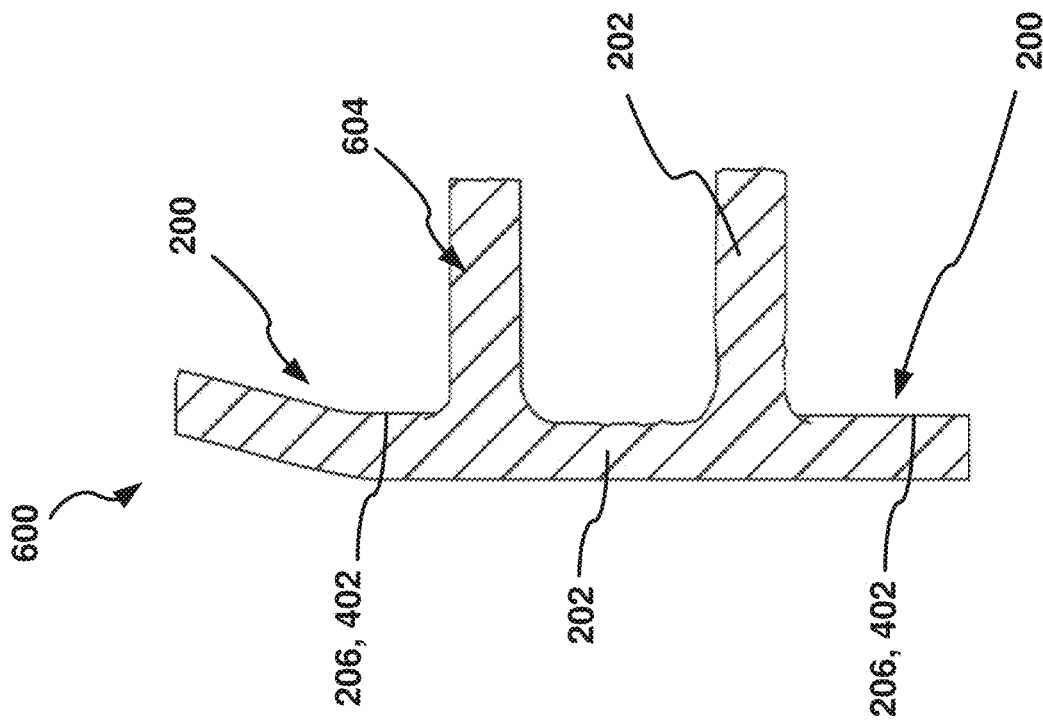
FIG. 8 illustrates a cross section of an example of a machined ceramic matrix composite part.
Figure 7:
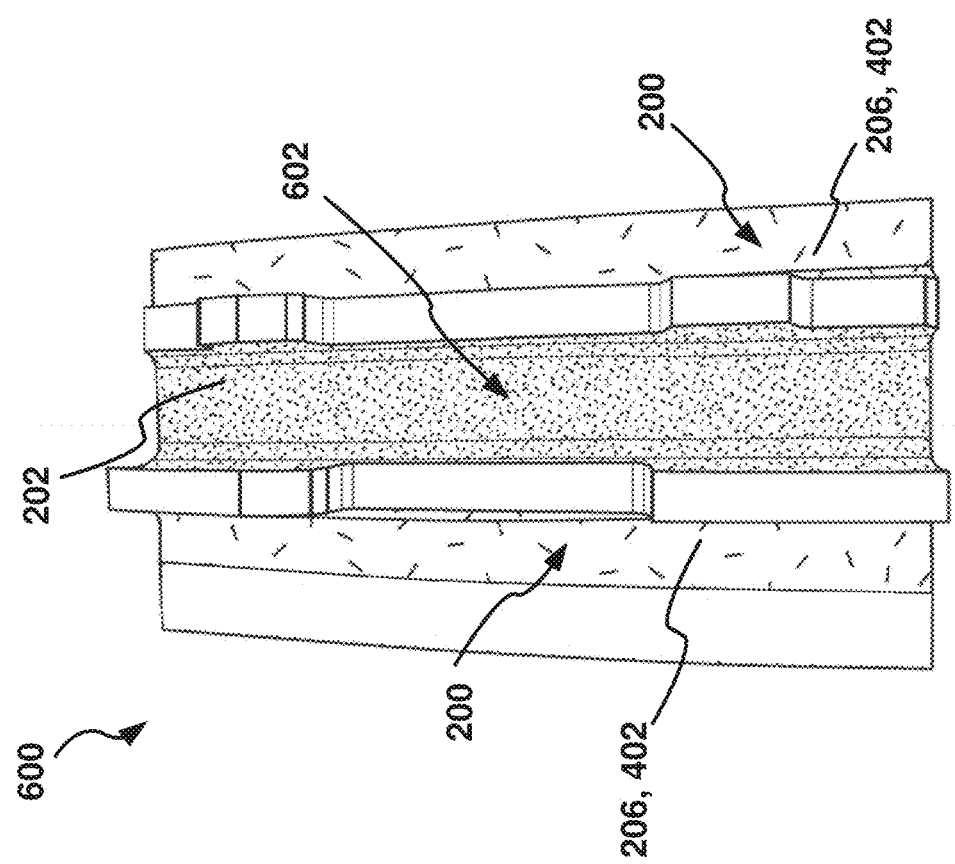
FIG. 7 is a side view of an example of a machined ceramic matrix composite part.

FIGS. 6A-B and 7-8 illustrate an example of a ceramic matrix composite part 600 with target areas 200, such as the target areas 200 shown in FIGS. 2-5 and formed using the method shown in FIG. 1. FIGS. 6A-B and 7 illustrate a high-pressure seal segment 600 of a turbine engine, but the ceramic matrix composite part may, for example, be a different turbine component, such as a blade or vane. In the example shown in FIGS. 6A-B and 7, the target areas 200 may be, for example, seal lands and/or the ends of the part where an exact size specification is needed. Machinable stock 206, 402 may be built up in the target areas 200 of the ceramic matrix composite part 600 on areas of the part 600 that require precision machine features or specific dimensional tolerances. The machinable stock 206, 402 may only be applied to the critical target areas 200, leaving the remaining surface of the part 600 untreated. In FIGS. 6A-B and 7, the smooth, machined surface of the machinable stock on the target areas 200 is represented by the areas with sporadic, spaced out tic marks or dashes. Rough, regular as-formed areas 602 without machining are represented by a dotted surface. Machined CMC surfaces without machinable stock 604, where there exposed fibers, are represented by cross-hating.

The method illustrated in FIG. 1 may include additional, different, or fewer operations than illustrated. For example, although infiltrating the fiber preform with the matrix material includes slurry infiltration and melt infiltration in the example described above, infiltrating the fiber preform may include additional, fewer, or different infiltration processes, for example, such as chemical vapor infiltration.

As another example, the method may further comprise, before or after forming the framework, forming an interface coating on the fibers to provide a weak fiber-matrix interface once the CMC is formed, which can be beneficial for fracture toughness. Typically, the interface coating includes one or more layers comprising boron nitride and/or silicon-doped boron nitride. The CVI SIC matrix material is typically deposited after the interface coating.

As still another example, the method may further comprise applying further treatments such as applying a coating. An example of such a coating is an environmental barrier coating. An environmental barrier coating (EBC) may be applied to the CMC by depositing the EBC on the fully processed CMC part after the machining step. Additionally or alternatively, the applying EBC may be followed by additional machining.

The fibers 204 that serve as the framework of the fiber preform typically comprise silicon carbide, but may also or alternatively comprise another ceramic, such as silicon nitride, alumina, or aluminosilicate, or carbon. In some examples, the ceramic matrix composite may be referred to as a SiC/SiC composite. The ceramic matrix composite produced may form part or all of a component of a gas turbine engine, such as a blade or vane.

To clarify the use of and to hereby provide notice to the public, the phrases "at least one of <A>, <B>, and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a method to produce a ceramic matrix composite part, the method comprising: providing a ceramic fiber preform, the ceramic fiber preform including a three-dimensional framework of a plurality of ceramic fibers; prior to melt infiltration, adding a layer of machinable stock to a target area of the ceramic fiber preform; melt infiltrating the ceramic fiber preform; forming the ceramic matrix composite part by cooling the melt infiltrated ceramic fiber preform; and machining the part in the target area where the machinable stock is located.

A second aspect relates to the method of aspect 1 wherein the machinable stock comprises a layer of ceramic tape.

A third aspect relates to the method of any preceding aspect wherein he machinable stock comprises a layer of ceramic slurry.

A fourth aspect relates to the method of any preceding aspect wherein the machinable stock is sprayed onto the fiber preform.

A fifth aspect relates to the method of any preceding aspect wherein the machinable stock is water based.

A sixth aspect relates to the method of any preceding aspect wherein the machinable stock comprises ceramic slurry and ceramic tape.

A seventh aspect relates to the method of any preceding aspect wherein the target area of the ceramic fiber preform is an area of the ceramic matrix composite part with a precision machined surface feature.

An eighth aspect relates to the method of any preceding aspect wherein the machining the part comprises precision machining the part to meet dimensional tolerance requirements, A ninth aspect relates to the method of claim any preceding aspect wherein the machinable stock is between 0.3 to 1.2 mm thick.

A tenth aspect relates to the method of any preceding aspect wherein the ceramic matrix composite part is a vane or blade.

An eleventh aspect relates to the method of any preceding aspect wherein the machinable stock is applied to the preform at room temperature A twelfth aspect relates to the method of any preceding aspect wherein the ceramic matrix composite is a seal segment.

A thirteenth aspect relates to the method of any preceding aspect wherein the target area comprises a seal land, A fourteenth aspect relates to the method of any preceding aspect wherein the target area comprises a datum surface.

A fifteenth aspect relates to the method of any preceding aspect wherein the target area comprises a flow path area of a turbine.

A sixteenth aspect relates to the method of any preceding aspect further comprising slurry infiltrating the ceramic fiber preform before the layer of machinable stock is added.

A seventeenth aspect relates to a method to produce a ceramic matrix composite part, the method comprising: providing a ceramic fiber preform, the ceramic fiber preform including a three-dimensional framework of a plurality of ceramic fibers; slurry infiltrating the ceramic fiber preform adding a layer of ceramic machinable stock to a target area of the ceramic fiber preform, wherein the target area is an area of the ceramic matrix composite part with precision machined surface features; melt infiltrating the ceramic fiber preform; forming the ceramic matrix composite part by cooling the melt infiltrated ceramic fiber preform; and machining the part in the target area where the machinable stock is located.

An eighteenth aspect relates to the method of aspect 17 wherein the ceramic matrix composite part is a turbine engine component.

A nineteenth aspect relates to the method of any preceding aspect wherein the target area is a flow path of a turbine, A twentieth aspect relates to the method of any preceding aspect wherein the target area is a datum surface.

In addition to the features mentioned in each of the independent aspects enumerated above, some examples may show, alone or in combination, the optional features mentioned in the dependent aspects and/or as disclosed in the description above and shown in the figures.

What is claimed is:

1. A method to produce a ceramic matrix composite part, the method comprising:
    providing a ceramic fiber preform, the ceramic fiber preform including a three-dimensional framework of a plurality of ceramic fibers;
    prior to melt infiltration, adding a layer of machinable stock to only a target area of the ceramic fiber preform, wherein the target area comprises less than a total surface area of the ceramic matrix composite part;
    melt infiltrating the ceramic fiber preform;
    forming the ceramic matrix composite part by cooling the melt infiltrated ceramic fiber preform;
    machining the part in the target area where the machinable stock is located; and forming a precision feature in the machinable stock disposed on the target area.

2. The method of claim 1 wherein the machinable stock comprises a layer of ceramic tape.

3. The method of claim 1 wherein the machinable stock comprises a layer of ceramic slurry.

4. The method of claim 3 wherein the machinable stock is sprayed onto the fiber preform.

5. The method of claim 3 wherein the machinable stock is water based.

6. The method of claim 1 wherein the machinable stock comprises ceramic slurry and ceramic tape.

7. The method of claim 1 wherein the target area of the ceramic fiber preform is an area of the ceramic matrix composite part with a precision machined surface feature.

8. The method of claim 1 wherein the machining the part comprises precision machining the part to meet dimensional tolerance requirements.

9. The method of claim 1 wherein the machinable stock is between 0.3 to 1.2 mm thick.

10. The method of claim 1 wherein the ceramic matrix composite part is a vane or blade.

11. The method of claim 1 wherein the machinable stock is applied to the preform at room temperature.

12. The method of claim 1 wherein the ceramic matrix composite is a seal segment.

13. The method of claim 1 wherein the target area comprises a seal land.

14. The method of claim 1 wherein the target area comprises a datum surface.

15. The method of claim 1 wherein the target area comprises a flow path area of a turbine.

16. The method of claim 1 further comprising slurry infiltrating the ceramic fiber preform before the layer of machinable stock is added.

17. A method to produce a ceramic matrix composite part, the method comprising:
    providing a ceramic fiber preform, the ceramic fiber preform including a three-dimensional framework of a plurality of ceramic fibers;
    slurry infiltrating the ceramic fiber preform
    adding a layer of ceramic machinable stock to a only target area of the ceramic fiber preform, wherein the target area is an area of the ceramic matrix composite part with precision machined surface features, wherein the target area comprises less than a total surface area of the ceramic matrix composite part;
    melt infiltrating the ceramic fiber preform;
    forming the ceramic matrix composite part by cooling the melt infiltrated ceramic fiber preform;
    machining the part in the target area where the machinable stock is located; and
    forming a precision feature in the machinable stock disposed on the target area.

18. The method of claim 17 wherein the ceramic matrix composite part is a turbine engine component.

19. The method of claim 18 wherein the target area is a flow path of a turbine.

20. The method of claim 18 wherein the target area is a datum surface.

* * * * *